United States Patent Office 3,150,189
Patented Sept. 22, 1964

3,150,189
PRODUCTION OF DICHLOROACETALDEHYDE
David Daniel Centola, Rockville, Md., and Nicholas Racsok, Carteret, N.J., assignors to FMC Corporation, New York, N.Y., a corporation of Delaware
No Drawing. Filed Oct. 31, 1961, Ser. No. 148,855
4 Claims. (Cl. 260—601)

The present invention is concerned with the production of dichloroacetaldehyde by the chlorination of acetaldehyde or its polymers and more particularly, to an improved method for producing dichloroacetaldehyde having reduced quantities of monocholoracetaldehyde and other impurities.

Dichloroacetaldehyde is employed as an intermediate in producing an insecticide, 1,1,di-(4-chlorophenyl)-2,2,dichloroethane (DDD) which is an analog of DDT. In this process, dichloroacetaldehyde with low concentrations of impurities, particularly monochloroacetaldehyde is desirable in order to obtain a final product having a clear color and a good set point.

One current method for producing dichloroacetaldehyde is carried out by chlorinating either paraldehyde or acetaldehyde in two successive steps, during which HCl gas is evolved. In the initial step, stoichiometric quantities of chlorine and paraldehyde are mixed in the first reactor at a temperature of about 75 to 80° C. The partially chlorinated product is then transferred to a second vessel and there subjected to additional chlorination with excess chlorine. The amount of chlorine which is added is regulated depending upon the absorption of the chlorine in the solution. This can be measured by analyzing the overflow gases to determine the quantity of HCl which is present. The principal reaction which takes place is illustrated below:

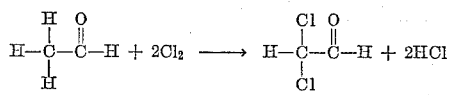

In addition to the principal reaction illustrated above, two side reactions also take place leading to the formation of monochloroacetaldehyde and trichlorotacetaldehyde (chloral). These side reactions are illustrated below:

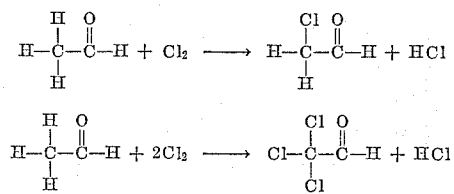

When paraldehyde is employed as the feed, an additional impurity is obtained by the reaction of cyclic paraldehyde with chlorine to form cyclic chlorinated paraldehyde.

One of the principal problems that has arisen in this process for producing dichloroacetaldehyde is the large quantities of monochloroacetaldehyde which are produced in the final product. The amount of monochloroacetaldehyde is generally on the order of about 10% by weight of the final reaction mixture. A typical reaction product obtained from this process is 84.5% dichloroacetaldehyde, 13.2% monochloroacetaldehyde, 2.0% chloral, and 0.3% chlorinated impurities. This side product is most objectionable because it produces an inferior grade of the insecticide, DDD, identified above. Removal of the monochloroacetaldehyde from the dichloroacetaldehyde is difficult because the monochloroacetaldehyde boils only 3° below the dichloroacetaldehyde. As a result, separation by normal distillation is impossible.

It is an object of the present invention to produce dichloroacetaldehyde by the chlorination of acetaldehyde or its cyclic polymers in a process in which the quantity of monochloroacetaldehyde is materially reduced.

It is a further object of the present invention to produce dichloroacetaldehyde by the chlorination of acetaldehyde or its cyclic polymers in a process in which the efficiency of conversion to dichloroacetaldehyde is increased.

It has now been found that dichloroacetaldehyde can be produced by chlorination of acetaldehyde or its cyclic polymers in which the quantity of monochloroacetaldehyde is drastically reduced by carrying out the chlorination in the presence of from about 0.5 to about 2.0% by weight of either benzenesulfonic acid, toluenesulfonic acid, or methanesulfonic acid. These sulfonic acids can be used alone or in combination with small amounts, i.e. on the order of about 0.1%, of antimony trichloride.

The selective catalytic effect of these sulfonic acid catalysts is most unusual. These catalysts selectively catalyze the conversion of the monochloroacetaldehyde to dichloroacetaldehyde without catalyzing dichloroacetaldehyde to trichloroacetaldehyde. As a result, any monochloroacetaldehyde which is present in the reaction mixture is selectively converted to dichloroacetaldehyde. However, this catalyst does not catalyze the reaction for conversion of the desired product, dichloroacetaldehyde, to trichloroacetaldehyde. In addition, when paraldehyde is used as the feed, these catalysts catalyze the conversion of paraldehyde to acetaldehyde, thereby eliminating the formation of chlorinated paraldehyde side products.

The present invention is preferably carried out by chlorinating acetaldehyde or paraldehyde in a two-step procedure. Single-stage operation is possible, but the two-step process permits better chlorination. In general, it is preferred to use paraldehyde as a feed material because it has a higher boiling point than acetaldehyde, and therefore can be maintained at higher temperatures under atmospheric pressures. The paraldehyde is added to the first reactor and chlorine gas is bubbled through the liquid. The chlorine gas is normally added in stoichiometric amounts and HCl and unreacted chlorine gas are removed overhead. Since the chlorinating step is an exothermic reaction step, cooling means are employed for maintaining the mixture at temperatures of between 75 to 80° C. The partially chlorinated product is then passed into a second stage where excess chlorine is passed through the solution until conversion to dichloroacetaldehyde is completed.

The catalyst can be added at either or both of the reaction vessels, and is most conveniently introduced by passing it into the reaction vessels with the feed stream. The method of introduction into the reaction vessels is immaterial provided that the catalyst is present in the reaction vessel when chlorination is taking place. The sulfonic acid catalyst is added in amounts of about 0.5 to about 2.0% by weight. A leveling off effect is obtained at about 2% concentration so that amounts of sulfonic acid in excess of 2.0% do not show any material improvement.

The sulfonic acid can be used alone, but even better results are obtained when small amounts of antimony trichloride, i.e. on the order of about 0.1% by weight are present. Combinations of 1% toluenesulfonic acid and 0.1% antimony trichloride are capable of reducing the monochloroacetaldehyde concentration in the dichloroacetaldehyde product to below 0.5% by weight. It should be noted however, that antimony trichloride will catalyze the reaction of dichloroacetaldehyde to trichloroacetaldehyde when used in sufficiently high quantities. Accordingly, the amount of antimony trichloride employed should never be in excess of 0.5% by weight.

The present process can be carried out in either a continuous manner or in a batch process. Continuous operation is preferred since greater yields of product can be obtained with the same size equipment. In a continuous process, the catalyst is added continuously by periodic additions to the feed streams.

The effect of adding these sulfonic acid catalysts in increasing amounts is shown by the following correlation between weight of catalyst added and concentration of monochloroacetaldehyde in the finished product. In this case, the sulfonic acid which was added was para-toluenesulfonic acid.

| Percent catalyst added: | Concentration of MCA (weight percent) |
|---|---|
| 0.5 | 5.8 |
| 1.0 | 3.3 |
| 2.0 | 1.7 |

In the case of a mixture of 1.0% para-toluenesulfonic acid and 0.1% antimony trichloride, the monochloroacetaldehyde content in the final product was 0.42%. The above data is typical of the results obtained with this class of sulfonic acid catalysts.

The following examples are given to illustrate the invention but are not deemed limitative thereof.

EXAMPLE I

A batch run was made in the following manner: 200 grams of a product mixture obtained from a first-stage chlorination containing 83% dichloroacetaldehyde, 14% monochloroacetaldehyde, 2% chloral, and 2 grams of p-toluenesulfonic acid were placed in a 300 ml. 3-neck round bottom flask equipped with a magnetic stirrer, cold trap (−30 to −40° C.), thermometer and gas inlet tube. The p-toluenesulfonic acid constituted 1% by weight of the reaction mixture. The flask was immersed in a water bath maintained at 70–71° C. When the mixture reached 70° C. chlorine gas was introduced at a rate of 0.79 g./min. (250 ml./min.) and the temperature maintained at 69–70° C. Periodic samples were taken for analysis using vapor phase chromotography. Chlorination was carried out for 5 hours and the solution increased in weight by 15.8 grams. Analysis of the final product was: monochloroacetaldehyde 3.7%, dichloroacetaldehyde 93.1%, chloral 3.1%.

EXAMPLE II

A continuous run was performed in the following manner: to 75.0 grams of a product mixture obtained from a first-stage chlorination containing 83% dichloroacetaldehyde, 14% monochloroacetaldehyde, and 2% chloral was added 0.75 gram of p-toluenesulfonic acid and 0.075 gram of antimony trichloride. The mixture was placed in a 300 ml. 3-neck round bottom flask equipped with a magnetic stirrer, cold trap (−30 to −40° C.), thermometer, chlorine gas inlet tube and paraldehyde inlet tube. The flask was placed in a water bath maintained at 70 to 71° C. When the mixture reached 70° C., paraldehyde was introduced at a rate of 0.67 gram per minute. Simultaneously, chlorine gas was introduced at a rate of 1.95 grams per minute (624 ml./min.). The temperature varied from 67 to 71° C. Paraldehyde was added for 2 hours to the flask. One and one-half hours after the end of the paraldehyde addition, the chlorine rate was reduced to 0.79 gram per minute (250 ml./min.) and chlorination was continued for an additional three hours. An analysis of the end product at this point showed it to consist of 7.37% monochloroacetaldehyde, 89.02% dichloroacetaldehyde, and 3.61% chloral. Upon chlorination for an additional 4 hours at 67 to 70° C. at a chlorine rate of 0.79 gram per minute (250 ml./min.) a product was obtained containing 3.34% monochloroacetaldehyde, 90.55% dichloroacetaldehyde, 6.10% chloral.

EXAMPLE III

A continuous run was made as follows: 75.0 grams of a dichloroacetaldehyde product mixture from a first-stage chlorinator containing 83% dichloroacetaldehyde, 14% monochloroacetaldehyde and 2% chloral and 0.75 gram of p-toluenesulfonic acid were placed in a 300 ml. 3-neck round bottom flask equipped with a magnetic stirrer, cold trap (−30 to −40° C.), thermometer, chlorine gas inlet tube and paraldehyde feed tube. The flask was placed in a water bath maintained at 70–71° C. When the mixture reached 70° C. the paraldehyde was added at a rate of 1.95 grams per minute (624 ml./min.). The temperature varied from 67 to 69° C. Chlorination was continued for an additional 3 hours after the paraldehyde addition was completed. Seventy-five grams of this material was removed and used as the heel for the following day.

Successive runs using the same paraldehyde feed rate and chlorine feed rates were carried out on three successive days. At the beginning of each of these runs, 0.75 gram of p-toluenesulfonic acid was added. On the fourth day, the total product from the three previous runs was mixed together and chlorinated. Chlorination was performed in the presence of 2.3 grams of p-toluenesulfonic acid. The rate of chlorine addition was 1.95 grams per minute (624 ml./min.) and chlorination was carried out for 5 hours. The product was analyzed and found to contain 3.83% monochloroacetaldehyde, 93.23% dichloroacetaldehyde and 2.94% chloral.

EXAMPLE IV

A batch run was made in the following manner: 200 grams of a product mixture from a first-stage chlorination containing 83% dichloroacetaldehyde, 14% monochloroacetaldehyde and 2% chloral was added to 0.2 gram of antimony trichloride and 2 grams of p-toluenesulfonic acid. The mixture was placed in a 300 ml. 3-neck round bottom flask equipped with a magnetic stirrer, cold trap (−30 to −40° C.), thermometer and gas inlet tube. The flask was immersed in a water bath maintained at 70–71° C. When the mixture reached 70° C. chlorine gas was introduced at a rate of 0.79 gram per minute. The temperature of the reactants was maintained at 70° C. At the end of two hours of chlorination a sample was taken for analysis by Vapor Phase Chromotography. The results of the analysis show that the product mixture contained 0.42% monochloroacetaldehyde, 94.98% dichloroacetaldehyde and 4.60% chloral.

A second run was carried out as a control run to determine the amount of monochloroacetaldehyde which is obtained when chlorination is carried out in the absence of the present selected catalyst. This control run was carried out by placing 200 grams of a product mixture obtained from a first-stage chlorination containing 83% dichloroacetaldehyde, 14% monochloroacetaldehyde, and 2% chloral in a 300 ml. 3-neck round bottom flask equipped with a magnetic stirrer, cold trap (−30 to −40° C.), thermometer and gas inlet tube. No catalyst was added to the flask. The solution was heated to 70° C. in a water bath and chlorination started. The chlorine gas was introduced at a rate of 0.79 gram per minute and the temperature during chlorination was maintained at 70° C. At the end of 2½ hours of chlorination, a sample of the composition was subjected to analysis by Vapor Phase Chromotography. The final composition was found to be 13.2% monochloroacetaldehyde, 84.5% dichloroacetaldehyde and 2.3% chloral.

EXAMPLE V

A batch run was made in the following manner: 200 grams of a product mixture from a first-stage chlorination containing 83% dichloroacetaldehyde, 14% monochloroacetaldehyde and 2% chloral was added to 0.2 gram of methanesulfonic acid. The mixture was placed in a 300 ml. 3-neck round bottom flask equipped with a magnetic stirrer, cold trap (−30° to −40° C.), thermometer and gas inlet tube. The flask was immersed in a water bath maintained at 70–71° C. When the mixture reached 70° C. chlorine gas was introduced at a rate of 0.79 gram per minute. The temperature of the reactants was maintained at 70° C. At the end of 5½ hours of chlorination, a sample was taken for analysis by Vapor Phase Chromotography. The results of the analysis show that the product mixture contained 2.02% monochloroacetaldehyde, 94.54% dichloroacetaldehyde and 3.45% chloral.

EXAMPLE VI

A batch run was made in the following manner: 200 grams of a product mixture from a first-stage chlorination containing 83% dichloroacetaldehyde, 14% monochloroacetaldehyde and 2% chloral was added to 0.2 gram of benzenesulfonic acid. The mixture was placed in a 300 ml. 3-neck round bottom flask equipped with a magnetic stirrer, cold trap (−30 to −40° C.), thermometer and gas inlet tube. The flask was immersed in a water bath maintained at 70–71° C. When the mixture reached 70° C. chlorine gas was introduced at a rate of 0.79 gram per minute. The temperature of the reactants was maintained at 70° C. At the end of 5½ hours of chlorination, a sample was taken for analysis by Vapor Phase Chromotography. The results of the analysis show that the product mixture contained 2.0% monochloroacetaldehyde, 94.6% dichloroacetaldehyde and 3.4% chloral.

EXAMPLE VII

A batch run was made in the following manner: 200 grams of a product mixture from a first-stage chlorination containing 83% dichloroacetaldehyde, 14% monochloroacetaldehyde and 2% chloral was added to 0.2 gram of meta-toluenesulfonic acid. The mixture was placed in a 300 ml. 3-neck round bottom flask equipped with a magnetic stirrer, cold trap (−30 to −40° C.), thermometer and gas inlet tube. The flask was immersed in a water bath maintained at 70–71° C. When the mixture reached 70° C. chlorine gas was introduced at a rate of 0.79 gram per minute. The temperature of the reactants was maintained at 70° C. At the end of 5½ hours of chlorination, a sample was taken for analysis by Vapor Phase Chromotography. The results of the analysis show that the product mixture contained 2.1% monochloroacetaldehyde, 94.5% dichloroacetaldehyde and 3.4% chloral.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of producing dichloroacetaldehyde by the chlorination of acetaldehyde at temperatures of from about 67° to about 80° C. wherein chlorine is added to the acetaldehyde in at least stoichiometric amounts, the improvement which comprises carrying out the chlorination in the presence of from about 0.5 to about 2.0% by weight of a compound selected from the group consisting of benzenesulfonic acid, toluenesulfonic acid and methanesulfonic acid.

2. In the process of producing dichloroacetaldehyde by the chlorination of paraldehyde at temperatures of from about 67° to about 80° C. wherein chlorine is added to the paraldehyde in at least stoichiometric amounts, the improvement which comprises carrying out the chlorination in the presence of from about 0.5 to about 2.0% by weight of a compound selected from the group consisting of benzenesulfonic acid, toluenesulfonic acid and methanesulfonic acid.

3. In the process of producing dichloroacetaldehyde by the chlorination of paraldehyde at temperatures of from about 67° to about 80° C. wherein chlorine is added to the paraldehyde in at least stoichiometric amounts, the improvement which comprises carrying out the chlorination in the presence of:

(a) from about 0.5 to about 2.0% by weight of a compound selected from the group consisting of benzenesulfonic acid, toluene-sulfonic acid and methanesulfonic acid, and (b) about 0.1% by weight of antimony trichloride.

4. Process of claim 3 in which the compound (a) is p-toluenesulfonic acid.

References Cited in the file of this patent

UNITED STATES PATENTS

| | | |
|---|---|---|
| 2,863,924 | Pianfetti et al. | Dec. 9, 1958 |
| 2,947,671 | Veldhuis et al. | Aug. 2, 1960 |